US012790451B2

(12) United States Patent
Liang et al.

(10) Patent No.: US 12,790,451 B2
(45) Date of Patent: Nov. 10, 2026

(54) ARTICLE INCLUDING CONFORMAL OPTICAL THIN LAYERS

(71) Applicant: VIAVI SOLUTIONS INC., Chandler, AZ (US)

(72) Inventors: Kangning Liang, Santa Rosa, CA (US); Alberto Argoitia, Santa Rosa, CA (US); Jaroslaw Zieba, Santa Rosa, CA (US); Johannes P. Seydel, Petaluma, CA (US)

(73) Assignee: VIAVI SOLUTIONS INC., Chandler, AZ (US)

(*) Notice: Subject to any disclaimer, the term of this patent is extended or adjusted under 35 U.S.C. 154(b) by 0 days.

(21) Appl. No.: 17/872,288

(22) Filed: Jul. 25, 2022

(65) Prior Publication Data

US 2024/0026103 A1 Jan. 25, 2024

(51) Int. Cl.
*C08J 3/20* (2006.01)
*C08J 7/04* (2020.01)

(52) U.S. Cl.
CPC ................. *C08J 7/042* (2013.01); *C08J 3/20* (2013.01); *C08J 2300/12* (2013.01)

(58) Field of Classification Search
None
See application file for complete search history.

(56) References Cited

U.S. PATENT DOCUMENTS 12,271,011 B2 4/2025 Argoitia et al.
12,285,779 B2 4/2025 Argoitia et al.
2003/0190473 A1 10/2003 Argoitia et al.
2003/0224164 A1 12/2003 Argoitia et al.
2009/0040772 A1* 2/2009 Laney .................. G02B 5/0289 362/353
2010/0177398 A1 7/2010 Watanabe et al.
2011/0024928 A1 2/2011 Laney
2011/0176213 A1 7/2011 Yang et al.
2016/0075165 A1 3/2016 Machizaud et al.
2016/0109625 A1* 4/2016 Guimard .............. G02B 5/0242 156/60
2016/0216413 A1 7/2016 Naismith et al.
2018/0292588 A1 10/2018 Coggio et al.
2020/0142128 A1 5/2020 Baer et al.
2020/0215571 A1 7/2020 Argoitia et al.

FOREIGN PATENT DOCUMENTS

JP 2003004904 A 1/2003
JP 2006208726 A 8/2006
JP 2008114413 A 5/2008
JP 2011209657 A 10/2011
JP 2013152305 A 8/2013
JP 2018197829 A 12/2018
WO 2019230758 A1 12/2019

OTHER PUBLICATIONS

Alberto Argoitia et al., U.S. Appl. No. 19/179,666, filed Apr. 15, 2025, 37 pages.
Science Direct Topics, "PolyethyleneTerephthalate-an overview", downloaded from the Internet on May 9, 2025, 11 pages.(https://www.sciencedirect.com/topics/earth-and-planetary-sciences/polyethylene-terephthalate#:~:text=Microalgae:%20a%20promising%20tool%20for%20plastic%20degradation&text=PET%20waste%20has%20become%20a,et%20al.%2C%202012).).
EPO, "Communication pursuant to Article 94(3) EPC", dated Nov. 26, 2025, 12 pages.
Japanese Patent Office, "English translation of Notice of Reasons for Refusal for Japanese Application No. 2023-085431", dated Jun. 2, 2026, 11 pages.

* cited by examiner

*Primary Examiner* — Sheeba Ahmed
(74) *Attorney, Agent, or Firm* — Mannava & Kang, P. C.

(57) ABSTRACT

An article including a substrate; a diffuser polymer; and a thin layer of optical material 14 that conforms to a surface of the diffuser polymer is disclosed. A method of making the article is also disclosed.

19 Claims, 5 Drawing Sheets

ARTICLE INCLUDING CONFORMAL OPTICAL THIN LAYERS

FIELD OF THE INVENTION

The present disclosure generally relates to an article including a substrate; a diffuser polymer; and a thin layer of optical material that conforms to a surface of the diffuser polymer. A method of making the article is also disclosed.

BACKGROUND OF THE INVENTION

Optical devices that affect and modify the propagation of luminous energy, such as lasers and light-emitting diodes (LED), with the purpose of homogenizing or redistributing its energy content at a location farther away from the device are generally referred to as diffusers or beam shapers. Such devices are broadly characterized by a surface pattern that contains height variations that alter the direction of propagation of the incoming illumination in typically random directions within a certain range, which depends on the features of said surface pattern. Common examples of diffusers include ground glass, holographic diffusers, Gaussian diffusers, diffractive diffusers, periodic microlens array, and random microlens array.

What is needed is an article, such as a diffuser, having at least one of enhanced physical, mechanical, and optical properties. The article can provide refractive index matching to minimize reflection of light by the article. The article can enable designs for large field of view with low diffuser polymer thickness.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figure 1:
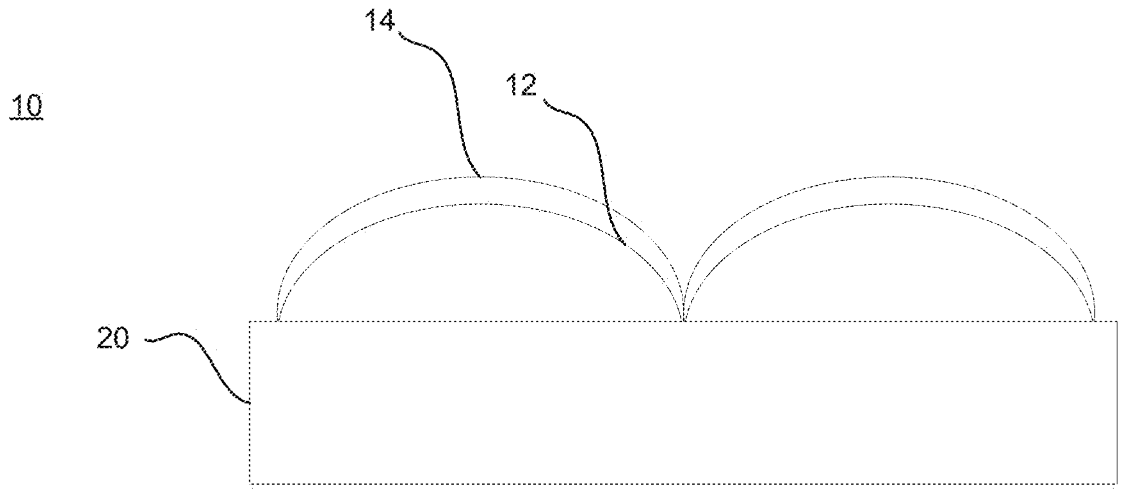
FIG. 1 illustrates an article according to an aspect of the invention.

In an aspect, there is disclosed an article including a substrate; a diffuser polymer; and a thin layer of optical material that conforms to a surface of the diffuser polymer.

In another aspect, there is disclosed a method of making an article, comprising providing a substrate; depositing a diffuser polymer on the substrate; and depositing a thin layer of optical material so that the thin layer of optical material conforms to the surface of the diffuser polymer.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein is an article 10, including a substrate 20; a diffuser polymer 12; and a thin layer of optical material 14 that can conform to a surface of the diffuser polymer 12. As will be discussed more thoroughly below, the thin layer of optical material 14 can be one or more thin layers of optical material 14. If more than one thin layer is present in the article 10, then the thin layers can be referred to as a first thin layer 14*a*, a second thin layer 14*b*, etc. It is understood that "first", "second", etc., and "a", "b", etc. are used solely to differentiate the elements of the article 10 from each other and are not intended to be limiting or to provide any physical or locational information.

The article 10 can be an optical element, for example, a diffuser. Each layer present on the diffuser polymer 12 can conform to a surface of the diffuser polymer 12 and, if present, any and all intervening layers (e.g., binding polymer 16, thin layer of optical material 14, low refractive index polymer 18). These conforming layers can provide at least one of the following properties: selective reflection (having designed refractive indices and thicknesses); anti-refractive (having a refractive index lower than the diffuser polymer 12); absorption control (having desired UV and visible light absorption); polarization control (using a liquid crystal polymer or nanoparticles); conductivity (using a conductive polymer or nanoparticles); aesthetic control (using a color absorption polymer or nanoparticles); anti-soiling function (using optical materials that also provide a hydrophobic function, such as silicone or fluorocarbon polymers); and mechanical (using optical materials that also improve flexibility, hardness, scratch-resistance, toughness, etc.).

The thin layer of optical material 14 can provide refractive index matching, such as with the diffuser polymer or the air, to reduce reflection of light by the article 10. In another aspect, the thin layer of optical material 14 can include nanoparticles, such as nanoparticles of a high refractive index optical material, to enable a large field of view. In a further aspect, the thin layer of optical material 14 can impart additional optical properties, such as color, conductivity, etc., to the article 10. In a further aspect, the thin layer of optical material 14 can impart physical and/or mechanical properties, such as hardness, scratch resistance, etc., to the article 10.

The article 10 can include a substrate 20. The substrate 20 can be formed of any transparent material. Non-limiting examples of suitable substrate materials include glass; diamond, fused silica; amorphous silicon, soda lime; polymers; such as polycarbonate, polymethylmethacrylate, polyethylene terephthalate, polyethylene, amorphous copolyester, polyvinyl chloride; siloxane based formulations, cyclic olefin copolymers, ionomer resin, transparent polypropylene, fluorinated polymeric systems, styrene methyl methacrylate, styrene acrylonitrile resin, polystyrene, and methyl methacrylate acrylonitrile butadiene styrene; and combinations thereof. In an aspect, the substrate 20 can be glass.

The substrate 20 can be present at a thickness ranging from about 0.05 mm to about 6.35 mm, for example, from about 0.1 mm to about 5 mm, and, as a further example, from about 0.15 mm to about 1.0 mm.

The substrate 20 can include one or more planar surfaces, such as a top surface, bottom surface, etc. It is understood that the terms "top", "bottom", etc. are intended to differential the surfaces and are not intended to limit. In an aspect, the diffuser polymer 12 can be present on at least a portion of the top surface of the substrate 20. For example, the diffuser polymer 12 can be present on a middle portion of the top surface of the substrate 20 with each end (e.g., first and second ends) void of diffuser polymer 12. In another aspect, the thin layer of optical material 14 can be present on at least a portion of the top surface of the substrate 20. For example, the thin layer of optical material 14 can be present on a first end (e.g., left) and/or a second end (e.g., right) of the top surface of the substrate 20. The first end and/or the second end of the top surface of the substrate 20 can be void of the thin layer of optical material.

The diffuser polymer 12 can be any transparent polymer that can be deposited on a surface of the substrate 20. The diffuser polymer 12 can be formed of any curable polymer. Non-limiting examples of a suitable diffuser polymer 12 include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; energy curable materials, such as acrylates, epoxies, vinyls, vinyl esters, styrenes, and silanes; and combinations thereof. Additional diffuser polymers 12 include, but are not limited to, silanes, siloxanes, titanates, zirconates, aluminates, silicates, phosphazanes, polyborazylenes, and polythiazyls.

The polymer chains of a diffuser polymer 12 can be crosslinked using a polymerization technique, and then cured. Non-limiting examples of a polymerization technique include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization. In an aspect, the diffuser polymer 12 can be deposited on the substrate, and crosslinked and/or cured using a technique such as a non-radical cure system, an ultraviolet light, a visible light, an infrared light, and/or an electron beam.

The diffuser polymer 12 can have a bottom surface that interfaces with a top surface of the substrate. The diffuser polymer 12 can have a top surface with a surface profile, such as a random surface profile, a periodic surface profile, and/or a patterned surface profile. The surface profile can be created by methods such as embossing, molding, or reactive-ion etching.

The surface profile of the diffuser polymer 12 can have a physical thickness greater than 0 nm, i.e., it is not just a planar top surface of the diffuser polymer 12. For example, the surface profile of the diffuser polymer 12 can have a physical thickness sufficient to include a depth of a microstructure. The surface profile of the diffuser polymer 12 can have a physical thickness from about 5 microns to about 500 microns, for example, from about 10 microns to about 200 microns, and as a further example from about 40 microns to about 100 microns, including all ranges and sub-ranges in between. The diffuser polymer 12 can be present at differing thicknesses along the top surface of the substrate 20.

Figure 3:
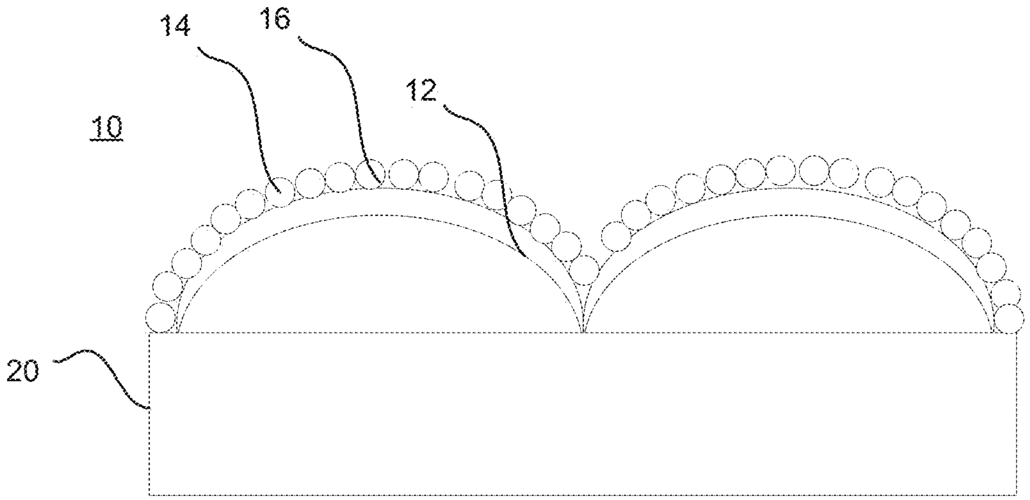
FIG. 3 illustrates an article according to another aspect of the invention.

The article 10 can include a thin layer of optical material 14 that conforms to a surface of the diffuser polymer 12 and/or a surface of a binding polymer 16, as shown in FIGS. 1 and 3. For example, the thin layer of optical material 14 can have a same shape, outline or contour as the surface, such as the surface profile, of the diffuser polymer 12 and/or a binding polymer 16. Each thin layer of optical material 14, whether a single layer (14*a*), or two or more layers (14*a*, 14*b*) can conform to a surface of the diffuser polymer 12, and any intervening layers of binding polymer 16 or optical material 14. By "thin layer" it is understood to mean having a physical thickness ranging from about 0.01 microns to about 20 microns, for example, from about 0.1 microns to about 5 microns, and as a further example from about 0.5 microns to about 2 microns.

A physical thickness of the diffuser polymer 12 to a physical thickness of the thin layer of optical material 14 can be about 5:1 or greater. The ratio can be adjusted so long as it is not detrimental to a light scattering profile of the article 10. It is noted that thickness ratio of the diffuser polymer 12 to the thin layer of optical material 14 can be influenced by a ratio of refractive indices of diffuser polymer 12 and any conforming layers (e.g., binding polymer 16, optical material 14, and/or light refractive index polymer 18). Additionally, the ratio can be determined by the surface profile of the diffuser polymer 12. The physical thickness ratio between the smallest surface profile of the diffuser polymer 12 defining a field of view to all conforming layers should be about 5:1 or greater.

Figure 2:
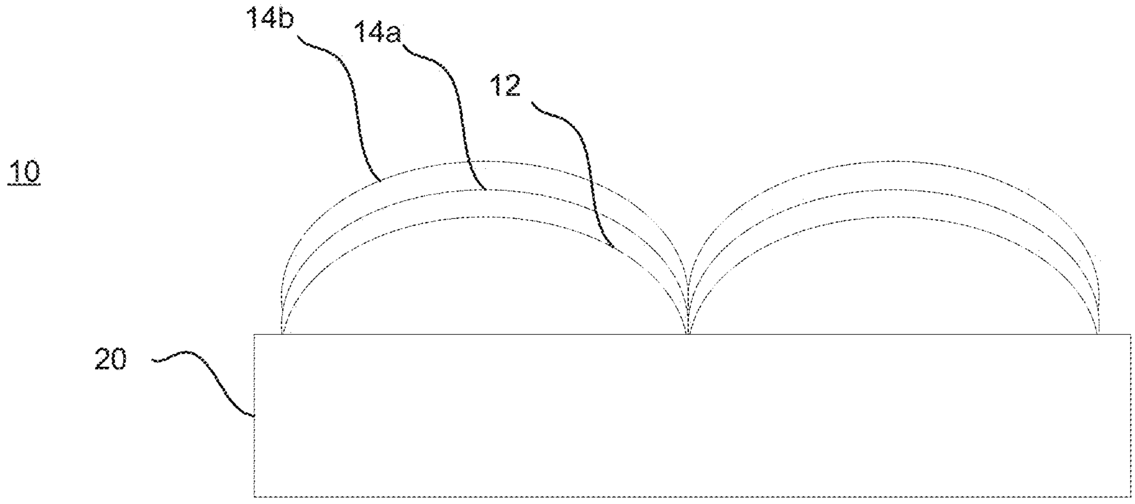
FIG. 2 illustrates an article according to another aspect of the invention.

The thin layer of optical material 14 can be a single layer, as shown in FIG. 1, or can be two or more thin layers of optical materials 14*a*, 14*b*, as shown in FIG. 2. In an aspect, an outermost (closest to air) thin layer of optical material 14, of the two or more thin layers of optical material, can have a low refractive index. In an aspect, each thin layer, such as the two or more thin layers of optical material 14*a*, 14*b*, can have a uniform thickness across each individual layer.

The thin layer of optical material 14 can be a layer of at least one optical material. Non-limiting examples of a suitable optical material include refractive index nanoparticles, selectively absorbing nanoparticles, liquid crystal polymers, conductive polymers, colorants, silicone, fluorocarbon polymer, and combinations thereof. Refractive index nanoparticles of optical material 14 can be nanoparticles of a high refractive index optical material. The high refractive index optical material 14 can be a hydride, a nitride, a carbide, or a metal oxide. Non-limiting examples of a high refractive index material include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($EU_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), silicon hydride (SiH), selenium trioxide ($Se_2O_3$), tin oxide ($SnO_2$), tungsten trioxide ($WO_3$), combinations thereof, or the like.

Refractive index nanoparticles of optical material 14 can be nanoparticles of a low refractive index optical material. Non-limiting examples of a suitable low refractive index optical material 14 include silicon dioxide (SiO2), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlFe$, $Na_6Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The selectively absorbing nanoparticles can be nanoparticles of an optical material that selectively absorbs light. Non-limiting examples of a selectively absorbing nanoparticle for use as an optical material 14 include copper, gold, chromium, aluminum, silver, nickel, palladium, platinum, titanium, vanadium, cobalt, iron, tin, tungsten, molybdenum, rhodium, niobium, carbon, graphite, silicon, geranium, cermet, and various combinations, mixtures, compounds, or alloys of the above selectively absorbing optical materials, scattering particles, or nanoparticles of organic pigments.

The liquid crystal polymer (LCP), for use as an optical material 14, can be one or more solidified polymeric liquid crystal components. The LCP can have a color that depends on the viewing angle, and can be composed of oriented, three-dimensionally crosslinked substances of liquid-crystalline structure with a chiral phase. The LCP structures can be obtained by subjecting one or more three-dimensionally crosslinkable liquid-crystalline substances with a chiral phase to orientation, then to three-dimensional crosslinking, and subsequently to comminution to the desired particle size. The LCP structures obtained are platelet-like particles comprising the cross-linked substance of a liquid crystal structure (i.e., the polymeric or monomeric fluid prior to crosslinking was in an ordered state of the liquid crystal type). Alternatively, the LCP structures can be formed by coating platelet-like particles with a liquid crystal material. The LCP structure can be made from a precursor composition comprising at least one nematic compound and at least one chiral dopant compound.

The thin layer of optical material 14 can be a conductive polymer. Non-limiting examples of a conductive polymer include polyacetylene, polypyrrole, polyindole, polyaniline, polyphenylene vinylene, polythiophene, polyphenylene sulfide, their copolymers, or combinations thereof. The conductive polymer can provide a conductive property to the article 10.

The thin layer of optical material 14 can be a colorant, such as a pigment or dye. Any dye or pigment recognized in the Colour Index™ published by the Society of Dyers and Colourists can be used, such as those with the designation "C.I. Pigment". Non-limiting examples of colorants also include carbon, graphite, perylene, perinone, quinacridone, pyrrole, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindolinone, pyranthrone, isoviolanthrone, miyoshi methane, triarylmethane, and mixtures thereof. An organic colorant can also be cobalt green, cobalt blue, Prussian blue, and manganese violet. The colorant can provide an aesthetic property to the article 10.

The optical material can be a fluorocarbon polymer. Non-limiting examples of a fluorocarbon polymer includes fluoroalkanes, perfluoroalkenes (e.g., perfluoroisobutene), fluoroalkenes (e.g., tetrafluoroethylene, hexafluoropropylene), fluoroalkynes (e.g., hexafluoro-2-butyne), perfluoroaromatic compounds, and combinations thereof. The fluorocarbon polymer can provide a hydrophobic property and low refractive index to the article 10.

If the thin layer of optical material 14 is two or more thin layers 14*a*, 14*b*, each thin layer of optical material 14*a*, 14*b*, etc. can have a different refractive index relative to each other, the diffuser polymer 12, and/or the air. In an aspect, the article 10 can include two or more thin layers of optical material 14*a*, 14*b* each with a different refractive index and physically positioned to form a refractive index gradient, such as from a low refractive index to a high refractive index or vice versa. An article 10 including a substrate 20, a diffuser polymer 12, and two or more thin layers of optical material 14*a*, 14*b*, wherein each of the two or more thin layers 14*a*, 14*b* can have different refractive indexes positioned in a gradient with respect to the diffuser polymer 12, each other, and/or air can form a selective reflector. In an aspect, the thin layer of optical material 14 can have a refractive index lower than a refractive index of the diffuser polymer 12.

A thin layer of optical material 14 can have a refractive index based upon the optical material 14. A thin layer of optical material 14 with a low refractive index can include an optical material 14 with a low refractive index (i.e., from about 1.1 to about 1.65). A thin layer of optical material 14 with a high refractive index can include an optical material 14 with a high refractive index (i.e., from greater than 1.65 to about 2.5).

The thin layer of optical material 14 can be a continuous sheet of a single optical material 14, a layer of nanoparticles of optical material 14, or combinations thereof. In an aspect, the thin layer of optical material 14 can be a layer of nanoparticles of the optical material 14.

Figure 4:
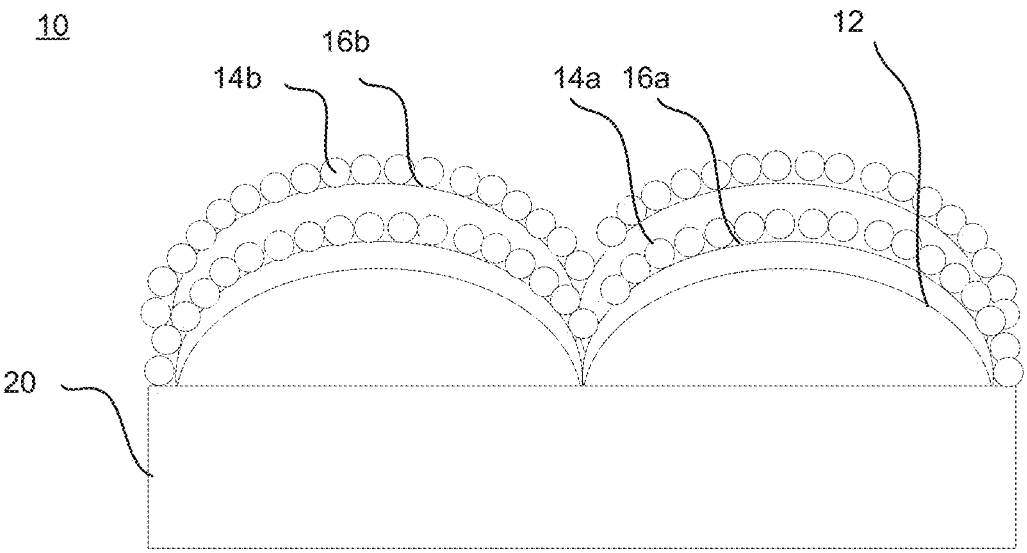
FIG. 4 illustrates an article according to another aspect of the invention.
Figure 5:
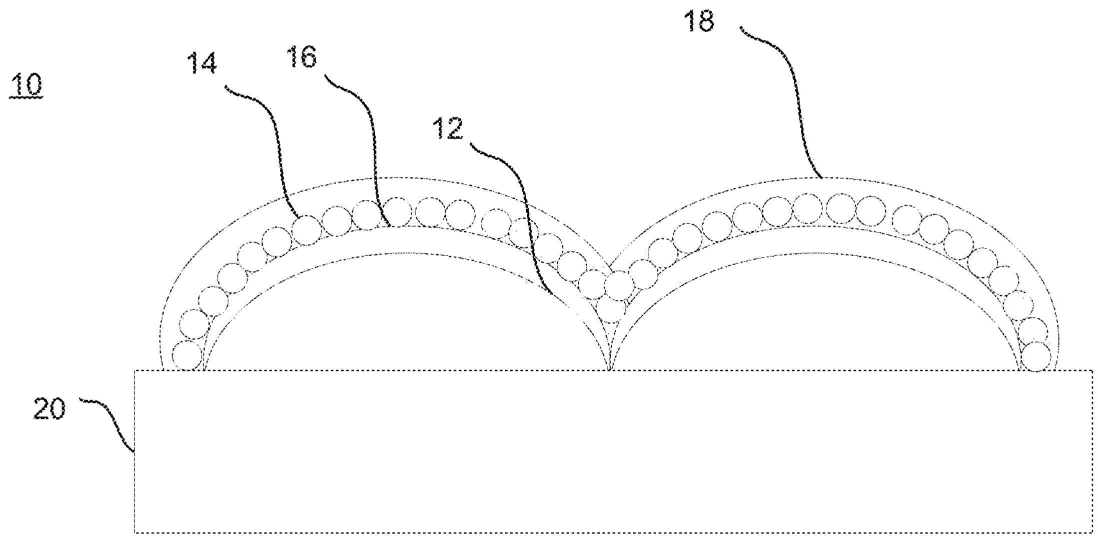
FIG. 5 illustrates an article according to another aspect of the invention.

The article 10 can also include a binding polymer 16, as shown in FIGS. 3-5. The binding polymer 16 can be present on a surface of the diffusing polymer 12, and can conform to the surface of the diffusing polymer 12 in a same or similar manner as the thin layer of optical material 14. The thin layer of optical material 14 can be present on the binding polymer 16, and can conform to the surface of the binding polymer 16. In this manner, the article 10 can include a binding polymer 16 and a thin layer of optical material 14, both of which conform to the surface of the diffusing polymer 12 and mimic the surface profile of the diffuser polymer 12.

In an aspect, the binding polymer 16 can be a single layer or can be two or more layers, such as a first binding polymer 16*a*, a second binding polymer 16*b*, and etc., as shown in FIG. 4. A first binding polymer 16*a* can be the same or different from a second binding polymer 16*b*.

The binding polymer 16 can be a polyelectrolyte or other molecule presenting interacting binding sites. The binding polymer 16 can include one or more polyelectrolytes, such as a polycation or a polyanion. Non-limiting examples of a polyelectrolyte include polyallylamine hydrochloride, polysodium 4-styrenesulfonate, poly(sodium styrene sulfonate), polyacrylic acid, polyethyleneimine, carboxymethylcellulose, polyphosphates, polyacrylamides, gelatins, chitosan, carrageenan, pectin, and combinations thereof. In an aspect, the polyelectrolyte can be chosen from polyallylamine hydrochloride, polysodium 4-styrenesulfonate, and combinations thereof.

The binding polymer 16 can be a charged material that can have an affinity to an oppositely charged material, such as the optical material 14. For example, the binding polymer 16 can be polyallylamine hydrochloride having a positive charge, which can have an affinity to a negative charge of optical material 14. The article 10 can include alternating layers of binding polymer 16 and thin layers of optical material 14 that can create a stronger interface between the layers and within the article 10.

The binding polymer 16 can be one or more layers, such as two or more layers (16*a*, 16*b*) of binding polymer 16. Two or more layers (16*a*, 16*b*) of binding polymer can be adjacent to one another or can be alternated with one or more (e.g., two or more) thin layers (14*a*, 14*b*) of optical material 14. In an aspect, the article 10 can include two or more layers (16*a*, 16*b*) of binding polymer 16 that can be the same or different and can be alternated with one or more (e.g., two or more) thin layers (14*a*, 14*b*) of optical material 14 that can be the same or different.

The article 10 can further include a low refractive index polymer 18 present on a top surface of the thin layer of optical material 14. Non-limiting examples of a low refractive index polymer include acrylate, polymethacrylate, polyurethane, polycarbonate, polystyrene, propionate, fluorinated polymers, acetate, siloxane, or combinations thereof.

FIG. 1 illustrates an article 10 including a substrate 20; a diffuser polymer 12; and a thin layer of optical material 14 that conforms to a surface of the diffuser polymer 12. In an aspect, the thin layer of optical material 14 can have a refractive index lower than a refractive index of the diffuser polymer 12. The article with such a structure can exhibit a reduced reflection of light as compared to an article 10 without the thin layer of optical material 14. The diffuser polymer 12 can have a refractive index, $n_p$, and the thin layer of optical material 14 can have a refractive index, $n_1$, so that the article 10 has a refractive index that satisfies $n_p>n_1$.

FIG. 2 illustrates an article 10 including a substrate 20; a diffuser polymer 12; and a thin layer of optical material 14, wherein the thin layer of optical material 14 can be two or more thin layers of optical material 14*a*, 14*b*. A bottom planar surface of the diffuser polymer 12 can interface with a portion of a planar top surface of the substrate 20. The diffuser polymer 12 can include a top surface with a surface profile. A first thin layer of optical material 14*a* can interface with the surface profile of the top surface of the diffuser polymer 12. A second thin layer of optical material 14*b* can interface with the first thin layer of optical material 14*a*. The first thin layer 14*a* can be different from the second thin layer 14*b*. A portion of the first thin layer, such as an end, can interface with a portion of the top surface of the substrate 20. A portion of the second thin layer 14*b* can interface with a portion of the top surface of the substrate 20.

The two or more thin layers of optical material 14*a*, 14*b* can improve the refractive index matching to the diffuser polymer 12 and/or the air, which can reduce reflection of light from the article 10. For example, each thin layer of optical material 14, 14*b* can have a smaller refractive index than a layer underneath. The diffuser polymer 12 can have a refractive index, $n_p$, the first thin layer of optical material 14*a* can have a refractive index, $n_1$, the second thin layer of optical material 14*b* can have a refractive index, $n_2$, so that the article can have a structure with a refractive index of $n_p>n_1>n_2$.

FIG. 3 illustrates an article 10 including a substrate 20, a diffuser polymer 12, a binding polymer 16, and a thin layer of optical material 14. A bottom planar surface of the diffuser polymer 12 can interface with a portion of a planar top surface of the substrate 20. The diffuser polymer 12 can include a top surface with a surface profile. The binding polymer 16 can be present on and conform to the top surface profile of the diffuser polymer 12. The thin layer of optical material 14 can be a layer of refractive index nanoparticles and can conform to the surface of the binding polymer 16. In this manner, both the binding polymer 16 and the thin layer of optical material 14 mimic the surface profile of the diffuser polymer 12. In an aspect, the diffuser polymer can have a refractive index $n_p$, and the nanoparticles can have a refractive index $n_{np}$, with the relationship as $n_{np}>n_p$. The binding polymer 16 can have a charge, and the thin layer of optical material 14, e.g., refractive index nanoparticles, can be oppositely charged. In this manner, the surface of the diffuser polymer can be enhanced in its refractive index.

FIG. 4 illustrates an article 10 including a substrate 20, a diffuser polymer 12, a first binding polymer 16*a*, a first thin layer of optical material 14*a*, a second binding polymer 16*b*, and a second thin layer of optical material 14*b*. The diffuser polymer 12 can include a top surface with a surface profile. The two or more binding polymers 16*a*, 16*b* and the two or more thin layers of optical material (14*a*, 14*b*) can conform to the top surface profile of the diffuser polymer 12. Each of the first and second thin layers of optical material 14*a*, 14*b* can be a layer of refractive index nanoparticles, can be alternated with the first and second binding polymer 16*a*, 16*b* to form a stack of adjacent layers. In this manner, each layer of the stack of adjacent layers (e.g., 16*a*/14*a*/16*b*/14*b*) can mimic the surface profile of the diffuser polymer 12.

FIG. 5 illustrates an article 10 including a substrate 20, a diffuser polymer 12, a binding polymer 16, a thin layer of optical material 14, and a low refractive index polymer 18. The thin layer of optical material 14 can be a layer of high refractive index nanoparticles. In an aspect, the diffuser polymer can have a refractive index $n_p$, and the layer of high refractive index nanoparticles 14 can have a refractive index $n_{np}$, and the low refractive index polymer 18 can have a refractive index $n_1$, with the relationship as $n_{np}>n_p\geq n_i$. The low refractive index polymer 18 can be positioned on the outermost surface (next to the air) of the article. In this manner, the article 10 can have enhanced anti-reflective properties.

A method of making the article 10, can include providing a substrate 20; depositing a diffuser polymer 12 on the substrate 20; and depositing a thin layer of optical material 14, wherein the thin layer of optical material 14 conforms to a surface of the diffuser polymer 12. Light reflected by the article can be reduced because the thin layer of optical material 14 can have a refractive index lower than a refractive index of the diffuser polymer 12. The thin layer of optical material 14 can be two or more thin layers of optical material 14*a*, 14*b*; and each thin layer, of the two or more thin layers of optical material, can have a refractive index less than the thin layer beneath.

In an aspect, the step of depositing the thin layer of optical material 14 can include solution-depositing a binding polymer 16 to a surface of the diffuser polymer 12; and depositing the thin layer of optical material 14 to a surface of the binding polymer 16. The solution-deposition of the binding polymer 16 to the surface of the diffuser polymer can be achieved by adjusting variables, such as pH, ion activity, solvent composition, etc. The thin layer of optical material 14 can be a dispersion of charged nanoparticle, which can be deposited onto a layer of binding polymer 16, which has an opposite charge to the nanoparticles. Multiple layers of binding polymer 16 and thin layers of optical material 14 can be deposited using the layer-by-layer technology described to form a stack of alternating layers.

Figure 6:
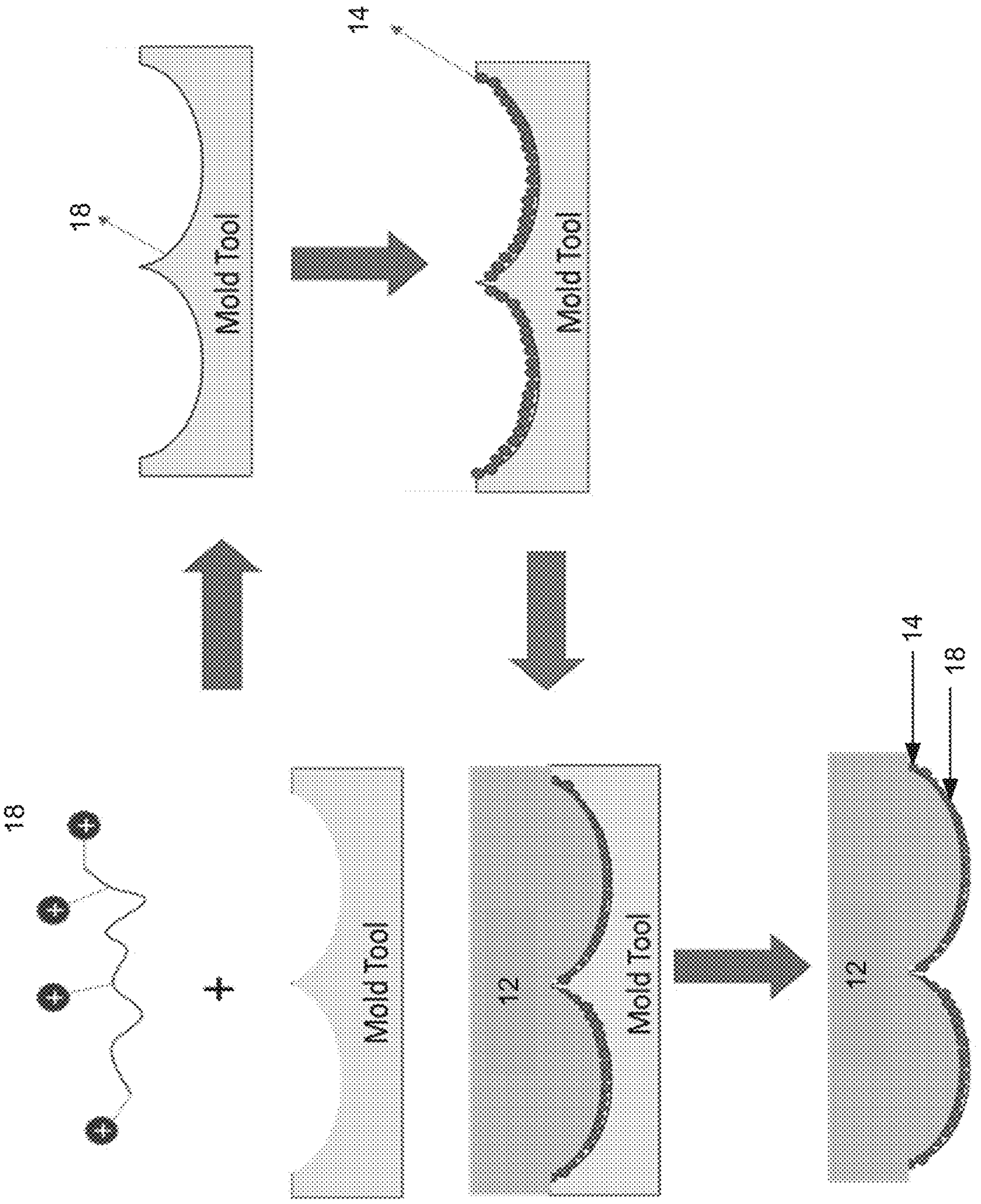
FIG. 6 is a flow chart for a method of making the article according to an aspect of the invention.

In another aspect, as illustrated in FIG. 6, the method of making the article can include the use of a mold tool. The method can include solution-depositing a low refractive index polymer 18 to a negative surface profile of a mold tool; depositing a thin layer of optical material 14 on the deposited low refractive index polymer 18; and depositing a diffuser polymer 12 on the deposited thin layer of optical material 14. The thin layer of optical material 14 can have a charge opposite to a charge of the low refractive index polymer 18. The thin layer of optical material 14 can be nanoparticles in a dispersion. The steps of depositing the low refractive index polymer 18 and depositing the thin layer of optical material 14 can be repeated one or more times to form alternating layers. The diffuser polymer 12 can be deposited as a liquid and can be allowed to self-level to form a planar surface. The use of the mold tool allows for replication of polymer diffusers with engineered surfaces. The method can comprise curing the diffuser polymer, and removing the mold tool. The diffuser polymer 12 will have a planar surface opposite an engineered surface (surface profile) with conforming layers of optical material 14 and a low refractive index polymer.

Figure 7:
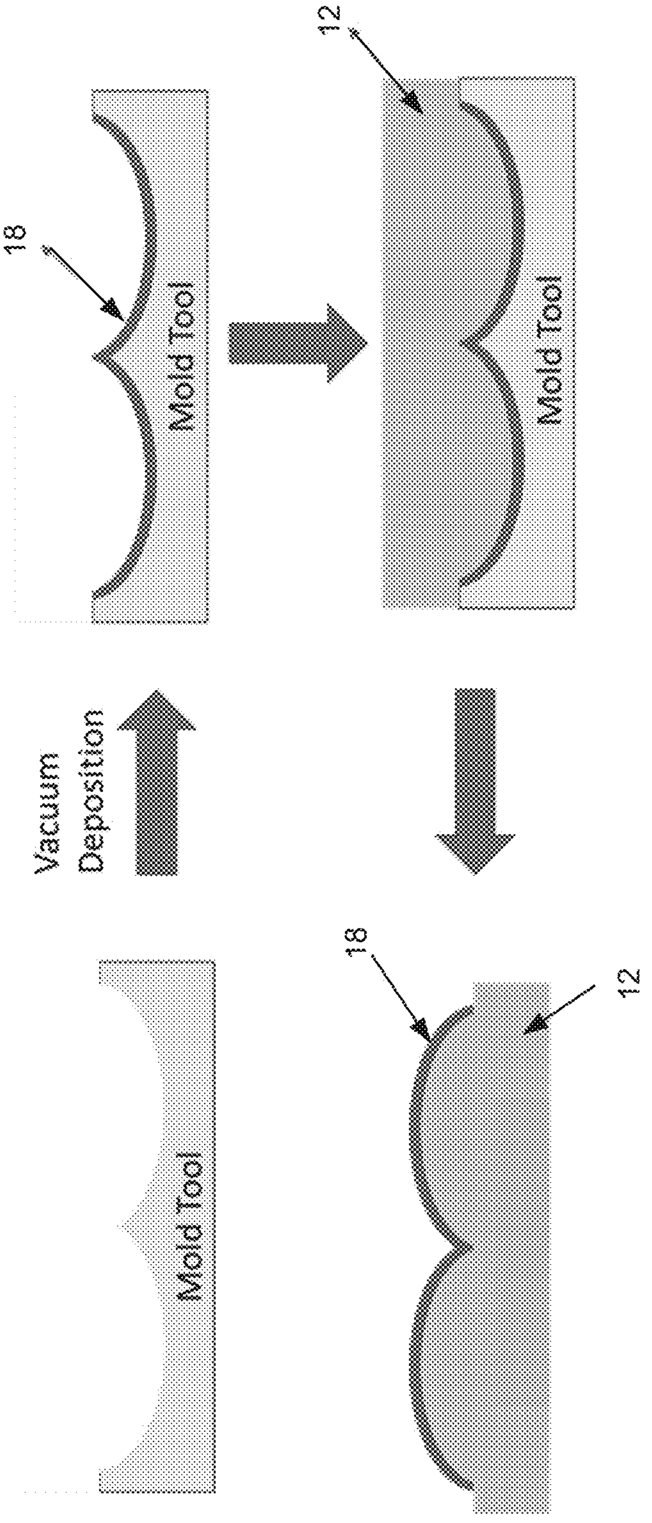
FIG. 7 is a flow chart for a method of making the article according to another aspect of the invention.

In another aspect, as illustrated in FIG. 7, the method of making the article can include the use of a mold tool. The mold tool can be made of a material that has weak interactions with high or low refractive index materials 18. In an aspect, a release layer can be present on a negative surface profile of the mold tool. The mold tool can include a negative surface profile. A high or low refractive index polymer 18 can be vacuum deposited on the negative surface profile of the mold tool. The method can include depositing a diffuser polymer 12 on the deposited high or low refractive index materials 18. The diffuser polymer 12 can cure. The mold tool can be removed.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A diffuser, comprising:

a substrate;

a diffuser polymer having a first surface on the substrate and a second surface opposite the first surface, the second surface being a curved surface; and first and second layers of optical material having curved surfaces that conform to the curved surface of the diffuser polymer, so that the curved surfaces of the first and second layers of optical material mimic the curved surface of the diffuser polymer, wherein the second layer of optical material is positioned above the first layer of optical material and has a refractive index that is lower than a refractive index of the first layer of optical material.

2. The diffuser of claim 1, wherein the first and second layers of optical material include refractive index nanoparticles, selectively absorbing nanoparticles, liquid crystal polymers, conductive polymers, colorants, silicone, fluorocarbon polymers, or a combination thereof.

3. The diffuser of claim 1, further comprising:

a binding polymer between the first layer of optical material and the second layer of optical material;

wherein the binding polymer is a layer that conforms to the curved surface of the diffuser polymer; and wherein the second layer of optical material includes a layer of refractive index nanoparticles.

4. The diffuser of claim 1, further comprising:

first and second layers of binding polymer; wherein the first and second layers of binding polymer are alternated with the first and second layers of optical material.

5. The diffuser of claim 4, wherein the first and second layers of binding polymer include different types of binding polymer, and the first and second layers of optical material include different types of optical material.

6. The diffuser of claim 1, further comprising:

a refractive index polymer on a top surface of the second layer of optical material, wherein the refractive index polymer has a refractive index that is lower than the refractive index of the second layer of optical material.

7. The diffuser of claim 1, wherein a ratio of a physical thickness of the diffuser polymer to a physical thickness of one of the first and second layers of optical material is 5:1.

8. The diffuser of claim 1, wherein a layer of the first and second layers of optical material includes a colorant.

9. The diffuser of claim 1, wherein the refractive indexes of the first and second layers of optical material are lower than a refractive index of the diffuser polymer.

10. The diffuser of claim 3, wherein the binding polymer is a charged material and the optical material has an opposite charge to the binding polymer.

11. The diffuser of claim 6, wherein the refractive index of the refractive index polymer is from about 1.1 to 1.65.

12. The diffuser of claim 1, wherein each layer, of the first and second layers of optical material, has a uniform thickness across each individual layer.

13. A method of making a diffuser of claim 1, comprising:

providing the substrate;

depositing the diffuser polymer on the substrate, the diffuser polymer having the first surface on the substrate and the second surface opposite the first surface, the second surface being a curved surface; and depositing the first and second layers of optical material on the second surface of the diffuser polymer;

wherein the first and second layers of optical material have the curved surfaces that conform to the curved surface of the diffuser polymer, so that the curved surfaces of the first and second layers of optical material mimic the curved surface of the diffuser polymer, and wherein the second layer of optical material is positioned above the first layer of optical material and has a refractive index that is lower than a refractive index of the first layer of optical material.

14. The method of claim 13, wherein light reflected by the diffuser is reduced because the refractive index of each of the first and second layers of optical material is lower than a refractive index of the diffuser polymer.

15. The method of claim 13, wherein the first and second layers of optical material are positioned to form a refractive index gradient.

16. The method of claim 13, wherein the step of depositing the first and second layers of optical material further comprises solution-depositing a binding polymer to the second surface of the diffuser polymer; and depositing a layer of the first and second layers of optical material to a surface of the binding polymer.

17. A method of making a diffuser of claim 1, comprising:

depositing refractive index polymer to a negative surface profile of a mold tool;

depositing the first and second layers of optical material on the deposited refractive index polymer; and depositing the diffuser polymer to the deposited first and second layers of optical material.

18. The method of claim 17, wherein the step of depositing the refractive index polymer is vacuum deposition or solution-deposition.

19. The diffuser of claim 1, wherein the first and second layers of optical material are positioned to form a refractive index gradient.

* * * * *